United States Patent
Potter et al.

(10) Patent No.: US 6,615,126 B1
(45) Date of Patent: Sep. 2, 2003

(54) TORQUE MANAGEMENT BASED TRACTION CONTROL SYSTEM

(75) Inventors: Kenneth J Potter, Almont, MI (US); Dean A Celini, Highland, MI (US); Daniel S Denton, Highland Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 5 days.

(21) Appl. No.: 10/091,872

(22) Filed: Mar. 5, 2002

(51) Int. Cl.$^7$ ................................................. B60T 8/00
(52) U.S. Cl. ......................................... 701/84; 180/197
(58) Field of Search ............................... 701/84, 79, 74, 701/70; 180/197

(56) References Cited

U.S. PATENT DOCUMENTS

| | | |
|---|---|---|
| 5,071,392 A | 12/1991 | Stall et al. |
| 5,092,434 A * | 3/1992 | Smith ........................ 477/39 |
| 5,213,177 A | 5/1993 | May |
| 5,467,750 A | 11/1995 | Braun et al. |
| 5,724,942 A | 3/1998 | Maute et al. |
| 5,833,572 A | 11/1998 | Leising et al. |
| 6,144,913 A | 11/2000 | Braun et al. |
| 6,186,116 B1 | 2/2001 | Armstrong et al. |
| 6,334,832 B1 * | 1/2002 | Heravi et al. ................. 475/85 |

OTHER PUBLICATIONS

2001/0053953 Gong et al——>Dec. 20, 2001.*

* cited by examiner

Primary Examiner—William A. Cuchlinski, Jr.
Assistant Examiner—Olga Hernandez
(74) Attorney, Agent, or Firm—Thomas A. Jurecko

(57) ABSTRACT

A vehicle traction control system that is based on the management of the torque that is produced by the vehicle power train. The actual angular acceleration of a portion of the vehicle drive line is compared to the maximum predicted angular acceleration of the portion of the vehicle drive line to determine the occurrence of a wheel slipping condition. In response to the detection of a wheel slipping condition, the amount of excess drive torque that is being produced by the power train is quantified and the drive torque that is produced by the power train is reduced by an amount which corresponds to the excess. When the slipping condition has been abated, the reduction in the magnitude of the drive torque that is produced by the power train is reduced and eventually eliminated.

19 Claims, 3 Drawing Sheets

TORQUE MANAGEMENT BASED TRACTION CONTROL SYSTEM

FIELD OF THE INVENTION

The present invention relates generally to vehicle traction control systems and more particularly to a vehicle traction control system that controls the acceleration of any one of the vehicle, the vehicle driveline and the vehicle power train by comparing an actual acceleration value to a predicted maximum.

BACKGROUND OF THE INVENTION

Conventional automotive vehicles are typically equipped with a power train for producing a source of rotary power and a driveline for transmitting rotary power to a set of vehicle drive wheels. While the modern power train configurations have, for the most part, proven themselves to be satisfactory for producing rotary power, several limitations have been noted. One such limitation of the modem power train configurations is their ability, on occasion, to supply too much rotary power to one or more of the vehicle drive wheels to thereby cause wheel slip which renders the vehicle somewhat more difficult to control.

Prior attempts to limit wheel slip typically employ a scheme that transfers torque from one or more of the slipping wheels to one or more of the non-slipping wheels. Although torque management schemes such as this are known to immediately reduce the magnitude by which the slipping wheel or wheels are slipping, the transfer of the excess torque to a non-slipping wheel can, at times, render the non-slipping wheels more susceptible to slip. This is particularly true when the vehicle is being operated on a surface with a relatively low coefficient of friction, such as on ice.

Accordingly, there is a need in the art for an improved traction control system and method for controlling the torque that is transmitted to the drive wheels of a vehicle.

SUMMARY OF THE INVENTION

In one preferred form, the present invention provides a method for abating wheel slip in a vehicle having a power train and a drive line. The method includes the steps of:

determining an actual angular acceleration ($\alpha_a$) of a portion of the drive line; determining a maximum predicted acceleration ($\alpha_p$) of the portion of the drive line; determining the existence of a wheel slip condition based on $\alpha_a$ and $\alpha_p$; if a wheel slip condition is occurring, determining an amount of excess torque ($T_x$) that is being delivered to the drive line; and reducing an amount of torque that is being delivered to the drive line by an amount ($T_{er}$) that is based on the value of $T_x$.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
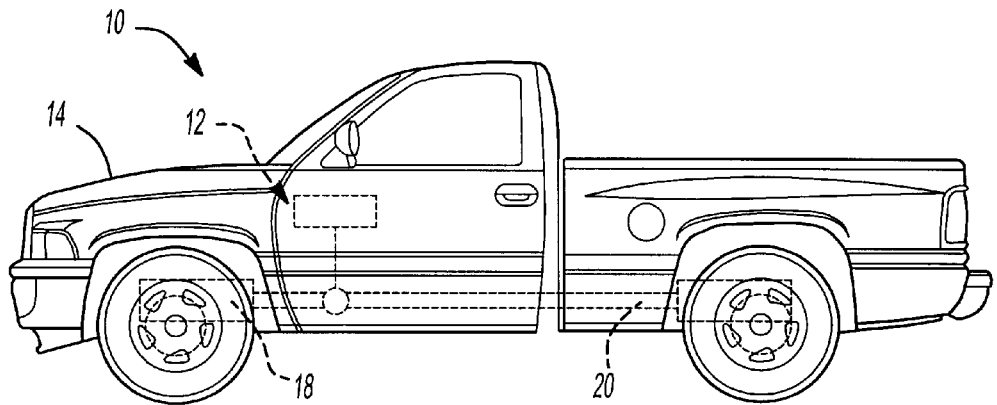
FIG. 1 is a perspective view of a vehicle having a traction control system constructed in accordance with the teachings of the present invention.
Figure 2:
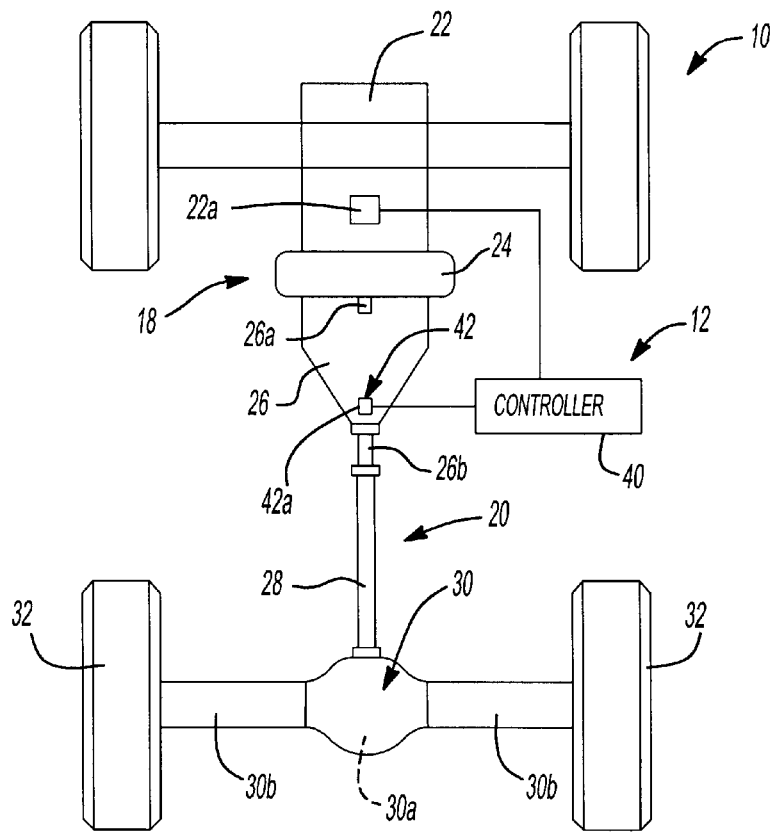
FIG. 2 is a schematic illustration of the vehicle of FIG. 1.

With reference to FIGS. 1 and 2, a vehicle 10 is illustrated to include a traction control system 12 that is constructed in accordance with the teachings of the present invention. The vehicle 10, which is illustrated to have a two-wheel drive configuration, conventionally includes a body 14, a power train 18 and a drive line 20. Those skilled in the art will understand that the teachings of the present invention may be applied to vehicles having other types of drive lines, including those having more than two drive wheels. In the example provided, the power train 18 and the drive line 20 are conventional in their construction and as such, need not be discussed in significant detail. Briefly, the power train 18 includes a propulsion source, such as an internal combustion engine 22, a torque converter 24 and a transmission 26, while the drive line 20 includes a prop shaft 28, a rear axle assembly 30 and a pair of drive wheels 32.

The engine 22 conventionally transmits rotary power via an output shaft (not specifically shown) into the torque converter 24, where the rotary output of the engine 22 is multiplied in a predetermined manner. The torque converter 24 is operable for multiplying the magnitude of a torsional load input to the transmission 26 via a transmission input shaft 26a. The transmission 26 conventionally includes a plurality of gear ratios that are selectively engagable to alter the speed ratio between the transmission input shaft 26a and a transmission output shaft 26b. Rotary power output from the transmission 26 is delivered to the drive line 20 for distribution to the drive wheels 32. In this regard, power is transmitted through the prop shaft 28 to the rear axle assembly 30 where a differential assembly 30a distributes the rotary power to the drive wheels 32 in a predetermined manner that is based on the construction of the differential assembly 30a and the methodology by which it is operated.

The traction control system 12 includes a controller 40 that is operably coupled to a plurality of sensors 42 that are located throughout the vehicle 10. As will be better understood from the discussion below, the plurality of sensors 42 are operable for generating sensor signals indicative of various vehicle characteristics that are relevant to determine whether excess torque is being delivered by the drive line 20, as well as the extent to which excess torque is being supplied. Such characteristics may include, for example, the rotational speed of a portion of the power train 18, such as the engine crankshaft (not specifically shown), the turbine (not specifically shown) of the torque converter 24 or the transmission input shaft 26a, and the rotational speed of a portion of the drive line 20, such as the drive wheels 32 or the prop shaft 28. The sensor signals that are generated by the plurality of sensors 42 are transmitted to the controller 40, either directly or via a network or data bus. The controller 40 may be integrated into an existing controller within the vehicle 10 (e.g. engine controller, transmission controller, body controller, anti-lock brake controller) which are commonly integrated into modem vehicles, or may be a discrete unit.

Under normal vehicle operating conditions, the torque transmitted through the drive line is expressed as acceleration of the vehicle inertia or absorbed losses known as road load. Setting the frame of reference to the transmission output shaft 54:

$$T_0 = (I_0)(\alpha_a) - T_{r1} \qquad \text{Equation 1}$$

where $T_{r1}$ is the torque that is necessary to overcome the road load; $\alpha_a$ is the angular acceleration measured at some point in the drive line 20; and $T_0$ is the magnitude of the torque that is provided to the drive line 20, such as the torque output from the transmission output shaft 26b.

The value $T_0$ is typically employed in the control of the engine 22, torque converter 24 and/or transmission 26 and as such, is typically either calculated or derived from variables that include the rate at which the engine 22 is being fueled, the engine speed, the operational state of the torque converter, the active gear ratio, etc.

The value $\alpha_a$ may be calculated based on sensor signals from sensors that sense the speed of the prop shaft 28 or axle shafts 30b, for example. In the particular embodiment provided, the value $\alpha_a$ is calculated from a sensor signal produced by a speed sensor 42a that monitors the rotational speed of the transmission output shaft 26b. While the transmission output shaft 26b has been characterized as being part of the power train 18, those skilled in the art will understand that as the transmission output shaft 26b and the prop shaft 28 rotate at the same rotational speed, a dedicated speed sensor for sensing the speed of the prop shaft 28 is not necessary.

The value of inertia reflected at the point of measure, $I_0$ is dependent upon the mass of the vehicle 10 and as such, tends to be constant over relatively short periods of time. It is presently preferred that the value $I_0$ be dynamically calculated (e.g., each time the ignition key is turned to "start" or each time the transmission 26 is shifted from "park" into a forward gear ratio setting, such as "drive") so as to better reflect the actual inertia of the vehicle 10. Commonly assigned U.S. Pat. Nos. 5,738,605, entitled "Anti-hunt Strategy for an Automatic Transmission", and 6,067,495, entitled "Acceleration Based Shift Strategy for an Automatic Transmission", which are hereby incorporated by reference as if fully set forth herein, detail one method by which the value $I_0$ may be calculated.

With the values $T_0$, $I_0$, and $\alpha_a$ being known, the value of $T_{r1}$ is calculatable under a non-slip condition. The value $T_{r1}$ includes friction, tire rolling resistance, aerodynamic drag and considerations for the grade upon which the vehicle 10 is operating and as such, the value $T_{r1}$ tends to be significant, particularly when the vehicle 10 is traveling at relatively high speeds.

For identification of slip condition, $T_{r1}$ can be assumed to be equal to zero (0), permitting the calculation of the maximum predicted acceleration of the drive line 20 from the equation:

$$\alpha_p = T_0 \div (I_0) \qquad \text{Equation 2}$$

where $\alpha_p$ is the maximum predicted angular acceleration of the portion of the drive line 20 (which, in the example provided, is the maximum predicted angular acceleration of the prop shaft 28 and the transmission output shaft 26b).

With $\alpha_a$ and $\alpha_p$ known, a value for the angular acceleration directly contributing to wheel slip, $\alpha_s$, is calculated from the equation:

$$\alpha_s = \alpha_a - \alpha_p \qquad \text{Equation 3}$$

where $\alpha_s$ is the angular acceleration contributing to wheel slip. When $\alpha_s$ is negative (i.e., when $\alpha_a$ is less than $\alpha_p$), there is no wheel slip. When $\alpha_s$ is positive (i.e., when $\alpha_a$ is greater than $\alpha_p$), a wheel slip event is occurring, the direct result of excess torque is being delivered to the drive line 20.

Since the angular acceleration due to wheel slip ($\alpha_s$) is known from Equation 3, the magnitude of the excess torque that is delivered to the drive line 20 (e.g., the prop shaft 28/transmission output shaft 26b) may be calculated through the equation:

$$T_x = (\alpha_s)(I_d) \qquad \text{Equation 4}$$

where the value $I_d$ is the reflected inertia of the drive line components (including tires, but excluding vehicle mass) 20, which is a known constant, and the value of $T_x$ is the excess torque delivered to the drive line 20.

With the value of $T_x$ being known from Equation 4, a reduction in the torque output by the engine 22 can be determnined to inhibit wheel slip. The value of the torque reduction at the engine 22 ($T_{er}$) necessarily accounts for the torque multiplication/speed reduction effects of the torque converter 24 and the transmission 26 and as such, is highly dependent upon the configuration of the power train 18. Given that the value $T_x$ is known, the calculation of $T_{er}$ is well within the capabilities of one skilled in the art and as such, need not be discussed in any significant detail herein.

In the particular example provided, the value of $T_{er}$ is calculated through the equation:

$$T_{er} = [(SF)(T_x)]/[(GR)(STR)] \qquad \text{Equation 11}$$

The value of GR is the gear ratio of the transmission 26 (i.e., the speed ratio between the transmission input shaft 26a and the transmission output shaft. The value of STR is the stall torque ratio of the torque converter 24. The stall torque ratio is the output torque of the torque converter 24 divided by the input torque of the torque converter 24. The value of SF is a factor that is greater than 1.0 which is employed to control the aggressiveness with which a wheel slip condition is abated. In general, it is desirable to aggressively abate situations where wheel slip may occur and as such, a value of about 1.1 to about 1.25 may be employed to initiate a reduction in torque to the drive line 20 that would bring the value of $T_0$ well below that required to produce the predicted acceleration to thereby ensure that the wheel slip condition was fully abated. The actual value of SF, however, preferably also takes into account concerns for the "driveability" of the vehicle 10 and the anticipated skill level of the driver (which tend to drive the value of SF closer to 1.0) and for the momentum of the engine flywheel (which tends to drive the value of SF further from 1.0). The value of $T_{er}$ is delivered to the engine controller 22a (typically via a data bus) to reduce the amount of torque that is being produced by the engine and thereby inhibit the wheel slip condition.

Figure 3:
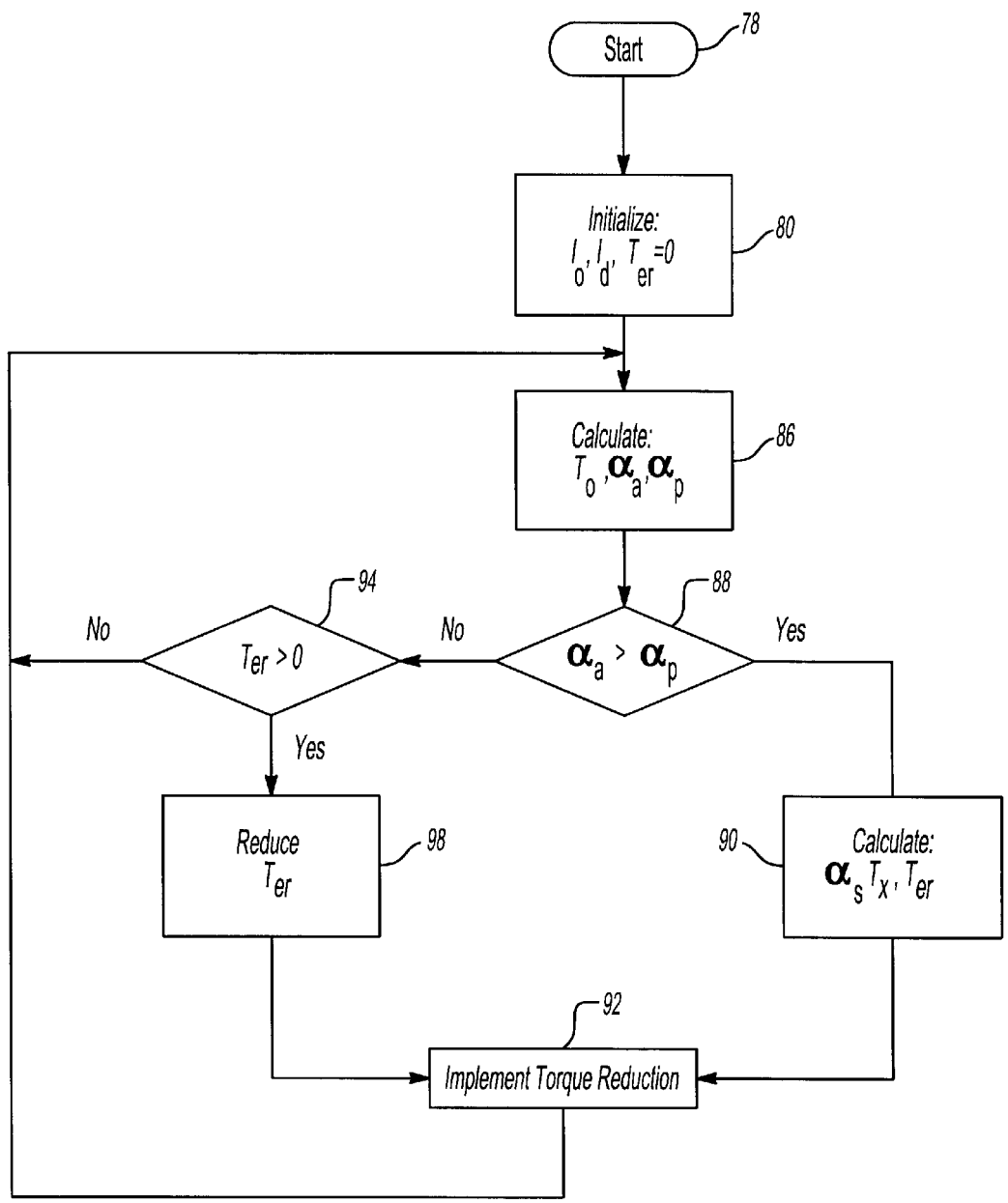
FIG. 3 is a schematic illustration in flow chart form of the methodology of the present invention.

With reference to FIG. 3, the methodology of the present invention is schematically illustrated in flowchart form. The methodology begins at block 78 and progresses to block 80 where inertia values $I_o$ and $I_d$ are initialized from the appropriate source. The value of $T_{er}$ is set to zero at this point to discontinue any previous torque management. The methodology then proceeds to block 86.

In block 86, the methodology calculates values for $T_0$, $\alpha_a$, and $\alpha_p$. The methodology then proceeds to decision block 88.

In decision block 88 the methodology determines whether $\alpha_a$ is greater than $\alpha_p$. If $\alpha_a$ is not greater than $\alpha_p$, then slip is not detected and the methodology proceeds to decision block 94 where it is determined if the torque management request is still active. If $\alpha_a$ is greater than $\alpha_p$ (indicating that wheel slip is occurring), the methodology proceeds to block 90.

In block 90, the methodology calculates $\alpha_s$, $T_x$ and $T_{er}$, identifying the amount of slip and necessary reduction in engine torque. The methodology then proceeds to block 92.

In block 92, the methodology causes the engine controller 22a to implement a reduction in engine torque corresponding in magnitude to the previously calculated $T_{er}$ so as to abate the wheel slip condition. The methodology then loops back to block 86.

In decision block 94, the methodology determines if $T_{er}$ is greater than zero (0). If the value of $T_{er}$ is not greater than zero, no torque reduction is active, so the methodology loops back to block 86 without requesting torque reduction. If the value of $T_{er}$ is greater than zero in decision block 94, torque management is still active and the methodology proceeds to block 98.

In block 98, the methodology reduces the value of $T_{er}$ in a predetermined manner. The methodology may set $T_{er}$ to zero to permit the power train 18 to provide "full" torque to the drive line 20. It is presently preferred, however, that the methodology gradually decrease the value of $T_{er}$ so as to guard against the occurrence of a second wheel slip condition. The amount by which $T_{er}$ is reduced may be, for example, a fixed, predetermined rate, a rate that is based on the initial value of $T_{er}$, or an amount that is based on the present value of $T_{er}$. The methodology then continues to block 92 where the actual torque reduction is implemented.

Figure 4A:
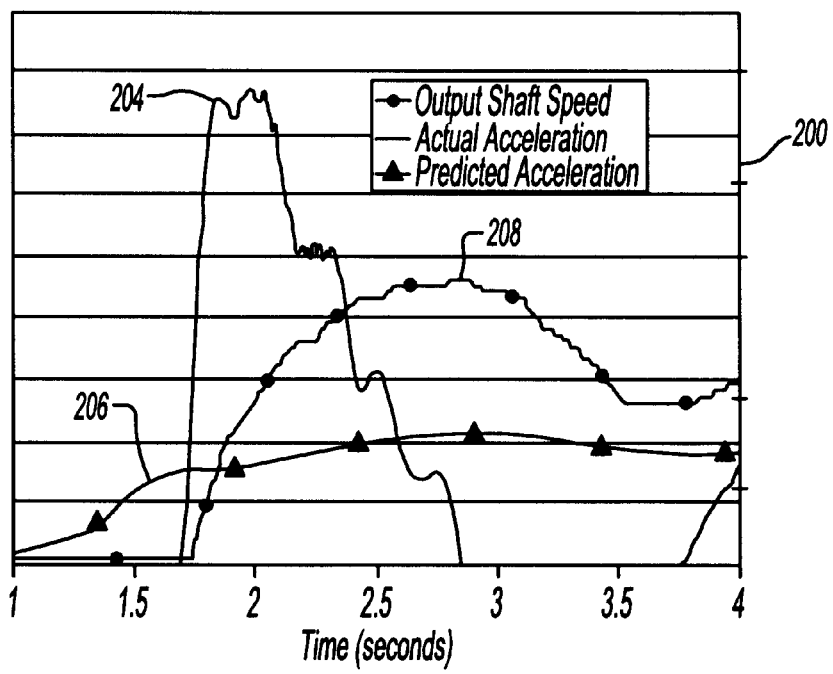
FIGS. 4A and B are plots illustrating the effectiveness of the traction control system and methodology of the present invention.
Figure 4B:
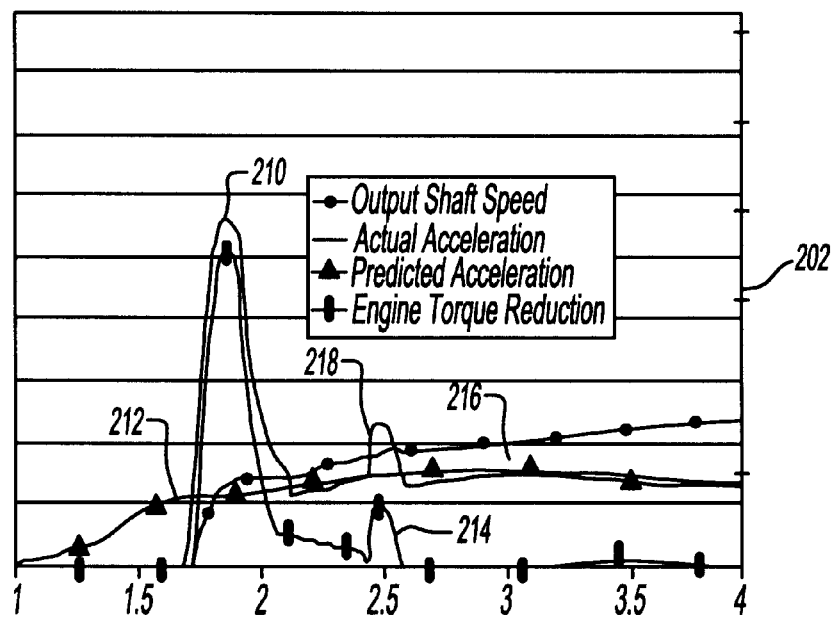

FIG. 4 is a plot that illustrating the effectiveness of the traction control system 12 of the present invention. The plot identified by reference numeral 200 illustrates the operation of the vehicle 10 with the traction control system 12 in a disabled or non-operative condition. The slip event is readily identified by the large difference between actual 204 and predicted 206 acceleration and the resulting peak in output shaft speed 208. As traction improves, output shaft speed decreases to match vehicle speed.

The plot identified by reference numeral 202 illustrates the operation of the vehicle 10 with the traction control system 12 in an enabled or operative condition. In this example a slip event is identified by the marked difference between actual 210 and predicted 212 acceleration. The amount of torque reduction 212 required to abate slip is calculated and implemented. After actual acceleration 210 is reduced to the level of predicted acceleration 212, the engine torque reduction value 214 is slowly reduced. A second slip event 218 is clearly demonstrated in this example and the traction control system 12 quickly responds to abate this slip. It should be noted the output shaft speed trace 216 reveals no peaks characteristic of a slip event.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. In a vehicle having a power train and a drive line, the drive line including at least one drive wheel, a method for controlling the power train to abate a wheel slip condition at the drive wheel, the method including the steps of:

determining an actual angular acceleration ($\alpha_a$) of a portion of the drive line;

determining a maximum predicted acceleration ($\alpha_p$) of the portion of the drive line;

determining the existence of a wheel slip condition based on $\alpha_a$ and $\alpha_p$;

if a wheel slip condition is occurring, determining an amount of excess torque ($T_x$) that is being delivered to the drive line; and reducing an amount of torque that is being delivered to the drive line by an amount ($T_{er}$) that is based on the value of $T_x$.

2. The method of claim 1, wherein $T_x$ is calculated from the equation $T_x=(\alpha_a-\alpha_p)(I_d)$.

3. The method of claim 2, wherein $T_{er}$ is calculated from the equation $T_{er}=[(SF)(T_x)]/[(GR)(STR)]$.

4. The method of claim 1, wherein $\alpha_p$ is calculated from the equation $\alpha_p=T_0\div(I_0)$.

5. The method of claim 1, wherein after the reducing step the method includes the steps of:

determining a new value of $\alpha_a$;

determining a new value of $\alpha_p$; and modifying $T_{er}$ based on the new values of $\alpha_a$ and $\alpha_p$.

6. The method of claim 5, wherein the modifying step includes the steps of:

increasing $T_{er}$ if $\alpha_a$ is greater than $\alpha_p$; and reducing $T_{er}$ if $\alpha_a$ is not greater than $\alpha_p$.

7. The method of claim 6, wherein a fixed increment is employed to reduce $T_{er}$.

8. The method of claim 6, wherein an amount by which $T_{er}$ is reduced is based on a present value of $T_{er}$.

9. The method of claim 6, wherein an amount by which $T_{er}$ is reduced is based on an initial value of $T_{er}$.

10. The method of claim 1, wherein the step of determining $\alpha_a$ includes the steps of:

providing a speed sensor for sensing a speed of an output member of the power train, the output member being rotatably coupled to an input member of the drive line;

sensing the speed of the output member; and determining the angular acceleration of the output member.

11. In a vehicle having a power train and a drive line, the drive line including at least one drive wheel, a method for controlling the power train to abate a wheel slip condition at the drive wheel, the method including the steps of:

determining an actual angular acceleration ($\alpha_a$) of a portion of the drive line;

determining a maximum predicted acceleration ($\alpha_p$) of the portion of the drive line, the value of $\alpha_p$ being calculated from the equation $\alpha_p=T_0\div(I_0)$;

determining the existence of a wheel slip condition based on $\alpha_a$ and $\alpha_p$; and if a wheel slip condition is occurring, determining an amount of excess torque ($T_x$) that is being delivered to the drive line, the value of $T_x$ being calculated from the equation $T_x=(\alpha_a-\alpha_p)(I_d)$.

12. The method of claim 11, further comprising the step of reducing an amount of torque that is being delivered to the drive line by an amount ($T_{er}$) that is based on the value of $T_x$, wherein $T_{er}$ is calculated from the equation $T_{er}=[(SF)(T_x)]/[(GR)(STR)]$.

13. The method of claim 12, wherein after the reducing step the method includes the steps of:

determining a new value of $\alpha_a$;

determining a new value of $\alpha_p$;

increasing $T_{er}$ if $\alpha_a$ is greater than $\alpha_p$; and reducing $T_{er}$ if $\alpha_a$ is not greater than $\alpha_p$.

14. The method of claim 13, wherein a fixed increment is employed to reduce $T_{er}$.

15. The method of claim 13, wherein an amount by which $T_{er}$ is reduced is based on a present value of $T_{er}$.

16. The method of claim 13, wherein an amount by which $T_{er}$ is reduced is based on an initial value of $T_{er}$.

17. The method of claim 11, wherein the step of determining $\alpha_a$ includes the steps of:

providing a speed sensor for sensing a speed of an output member of the power train, the output member being rotatably coupled to an input member of the drive line;

sensing the speed of the output member; and determining the angular acceleration of the output member.

18. A vehicle comprising:

a power train having a power source, an output member and a power train controller, the power source providing a source of rotary power, the output member being operable for outputting rotary power, the power train controller determining a magnitude of the rotary power that is produced by the power source;

a drive line having an input member and at least one drive wheel, the input member receiving the rotary power from the output member, the drive wheel rotating in response to receipt of the drive torque;

a plurality of sensors coupled to the power train and the drive line, the sensors being operable for sensing a plurality of vehicle characteristics and generating a sensor signal in response thereto, the vehicle characteristics including a rotational speed of a portion of the drive line;

a traction control system having a controller, the controller being coupled to the sensors, the power train controller and at least one of the power train and the drive line, the controller being operable for determining if excess rotary power is being supplied by the power train by comparing an actual angular acceleration of a portion of the drive line to a maximum predicted angular acceleration of the portion of the drive line, the controller being operable for determining a reduction in the magnitude of the rotary power that is output from the power train in response to a determination that the power train is providing excess rotary power.

19. The vehicle of claim 18, wherein the power train includes an engine, a torque converter and a transmission, the torque converter being characterized by a stall torque ratio (STR), the transmission having a plurality of gear ratios with one of the gear ratios being an active gear ratio (GR), wherein the drive train has a moment of inertia ($I_d$), and wherein magnitude of the excess rotary power ($T_{er}$) is based on the relationship $[(\alpha_a - \alpha_p)(I_d)]/[(GR)(STR)]$.

* * * * *